(12) United States Patent (10) Patent No.: US 7,454,433 B2
Ebert (45) Date of Patent: Nov. 18, 2008

(54) ADAPTIVE VIRTUAL COMMUNITIES

(75) Inventor: Peter S. Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 333 days.

(21) Appl. No.: 10/753,558

(22) Filed: Jan. 9, 2004

(65) Prior Publication Data

US 2005/0154693 A1 Jul. 14, 2005

(51) Int. Cl.
*G06F 17/00* (2006.01)
(52) U.S. Cl. ................... 707/102; 707/100; 707/101; 707/103 R
(58) Field of Classification Search ............ 707/1, 707/3, 10, 100–102, 103 R; 709/207
See application file for complete search history.

(56) References Cited

U.S. PATENT DOCUMENTS

| 6,421,724 | B1 | 7/2002 | Nickerson et al. | |
|---|---|---|---|---|
| 6,606,581 | B1 | 8/2003 | Nickerson et al. | |
| 2002/0169782 | A1* | 11/2002 | Lehmann et al. | 707/100 |
| 2004/0260781 | A1* | 12/2004 | Shostack et al. | 709/207 |
| 2005/0114366 | A1* | 5/2005 | Mathai et al. | 707/100 |

OTHER PUBLICATIONS

The Customer Experience Improvement Program, "Continuing Software Improvement at Microsoft," reprinted from http://ww.microsoft.com/products/ceip/english/default.htm printed on Jan. 9, 2004 (3 pages).
OpinionLab OnlineOpinion Web user feedback system, "A proven system to monitor and improve the online user experience based on continuously listening to visitors across your entire website," reprinted from http://www.opinionlab.com/ printed on Jan. 9, 2004 (1 page).
OpinionLab OnlineOpinion Web user feedback system, "7 Unique Benefits of the Online Opinon System," reprinted from http://www.opinionlab.com/more_about_oo.asp printed on Jan. 7, 2004 (2 pages).
"The OnlineOpinion System: Different From Other Feedback Techniques", 2002 OpinionLab, Inc, (3 pages).

* cited by examiner

*Primary Examiner*—Sana Al-Hashemi
(74) *Attorney, Agent, or Firm*—Fish & Richardson P.C.

(57) ABSTRACT

A system for providing adaptive virtual communities is described. The system monitors or has access to a plurality of users or contact information for users (e.g., e-mail addresses). By determining a technical or business context of a particular user, the system is able to match that user with other users who are likely to be able to assist the user within that context. As a result, virtual communities are dynamically created and disbanded on an as-needed basis, so that individual users do not need to wait for, or search for, assistance.

17 Claims, 12 Drawing Sheets

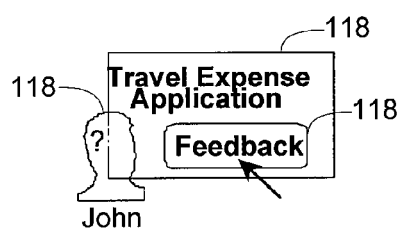
FIG. 12A
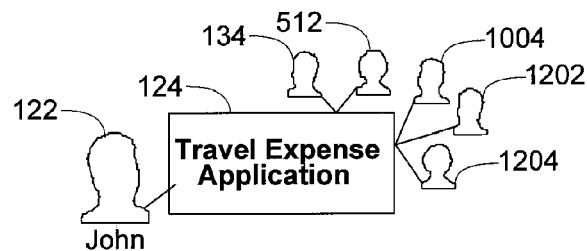
FIG. 12B
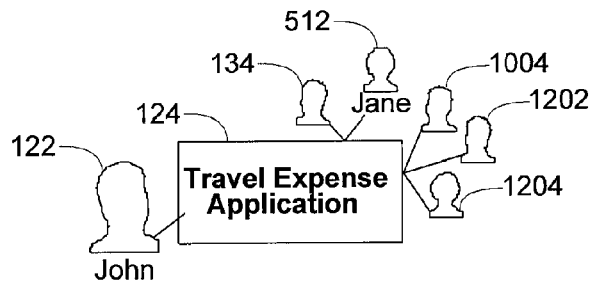
FIG. 12C
Instant Messenger
John: Hi Jane, could you please help me with...
Jane: Sure – just do the following...
FIG. 12D
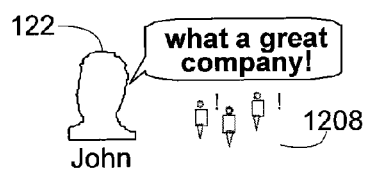
FIG. 12E
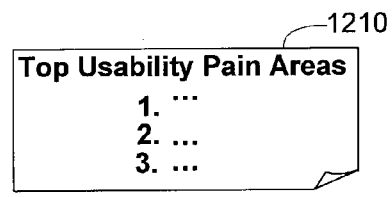
FIG. 12F

US 7,454,433 B2

ADAPTIVE VIRTUAL COMMUNITIES

TECHNICAL FIELD

This description relates to adaptive virtual communities.

BACKGROUND

Conventional systems exist for collecting user feedback and/or for improving software performance or functionality. Such systems have the potential to provide a wide collection of benefits to users and providers of software. For example, software users benefit from improved performance, ease of use, or increased functionality of a given software application. Employers who provide software in the workplace benefit from improved software and/or reduced software downtime, inasmuch as productivity may be increased for users of the software (as well as for information technology (IT) support staff). As a final example, a software producer may experience increased profitability when consumers are satisfied with software products and/or support for those products.

In providing feedback, some software systems automatically generate error messages in response to a software malfunction, where the messages may be sent to the software producer. Somewhat similarly, some software systems generate periodic messages (e.g., error messages or quality of service messages) for transmission to the software producer or other support personnel. In this way, the software producer may either respond to the error message directly, or simply compile the error message(s) for use in future improvements or upgrades of the software. Other systems invite structured and/or unstructured feedback from end users, and the feedback is evaluated by software support personnel.

In addition, various forums exist for discussion of topics, including software support forums. For example, users of a particular software application may subscribe to, or participate in, an Internet discussion forum, bulletin board, newsgroup, chat room, or other messaging techniques for communicating with other users. In such environments, for example, a user having a particular problem or issue with a software application may search a discussion forum for a user with a similar problem, or may post a question to the forum in the hopes that someone knowledgeable will see the question and respond.

SUMMARY

According to one general aspect, a system includes a context determination system operable to interact with a pool of users and determine a context of a first user within the pool of users, and further operable to match the first user with a second user from among the pool of users, based on the context, and a community facilitation system operable to facilitate communication between the first user and second user with respect to the context.

Implementations may include one or more of the following features. For example, the system may include a context history database that is operable to store records of determined contexts associated with each of the users within the pool of users.

In this case, the context determination system may be further operable to select context records from within the context history database that match the context of the first user. Further, a filtering system may be included that is operable to prioritize the selected context records based on an availability or relevance of their corresponding users, with respect to the context of the first user.

Also, a filtering system may be included that is operable to filter the selected context records to obtain filtered context records, one of the filtered context records being associated with the second user. In this case, a user profile database may be included that is operable to store user profile records associated with each user in the pool of users, wherein the filtering system may be operable to associate the selected context records with corresponding user profile records. Further, the filtering system may be operable to filter the selected context records by applying the corresponding user profile records against additional data sources to determine a relevance or availability of users associated with the corresponding user profile records with respect to the context of the first user.

The context determination system may be operable to match the first user with the second user in response to a request received from the first user. The context determination system may determine the context of the first user by presenting questions to the first user. The context determination system may determine the context of the first user based on a stream of telemetry data collected from a computer system of the first user.

The context may include a current business context of the first user, defined with respect to a business process of which the first user and the second user are a part. The context also or alternatively may include a current technical context of the first user, defined with respect to an operation of a software application being used by the first user, where the context determination system may be operable to determine that the second user has a familiarity with the operation of the software application.

The community facilitation system may be operable to facilitate communication between the first user and second user by providing contact information for the second user to the first user. The community facilitation system may be operable to facilitate communication between the first user and second user by establishing a communications link between the first user and the second user.

According to another general aspect, a context of a first user is determined from among a pool of users, the first user is matched with a second user from among the pool of users, based on the context, and communication between the first user and the second user with respect to the context is facilitated.

Implementations may include one or more of the following features. For example, in matching the first user with the second user, context descriptions corresponding to users within the pool of users may be determined, and matching context descriptions may be selected (from among the context descriptions) that correspond to the context of the first user.

In this case, in selecting matching context descriptions, the matching context descriptions may be prioritized based on an availability or relevance of the corresponding users, with respect to the context of the first user. Also, the matching context descriptions may be filtered to obtain filtered context descriptions, where one of the filtered context descriptions may be associated with the second user.

In filtering the matching context descriptions, the matching context descriptions may be associated with corresponding user profile records associated with each user in the pool of users, and the corresponding user profile records may be applied against additional data sources to determine a relevance or availability of users associated with the corresponding user profile records with respect to the context of the first user.

The context may include a current business context of the first user, defined with respect to a business process of which the first user and the second user are a part. Additionally, or alternatively, the context may include a current technical context of the first user, defined with respect to an operation of a software application being used by the first user.

In facilitating communication between the first user and the second user, contact information for the second user may be provided to the first user, or a communications link between the first user and the second user may be established. In determining the context of the first user, a request from the first user for establishment of a virtual community for resolving an issue being experienced by the first user may be received.

According to another general aspect, an apparatus includes a storage medium having instructions stored thereon. The instructions include a first code segment for defining potential members of a virtual community including a first member and a second member, based on a request from the first member regarding an issue being experienced by the first member, a second code segment for subscribing actual members from among the potential members, the actual members including the first member and the second member, to the virtual community, and a third code segment for facilitating communication between the actual members regarding the issue.

Implementations may include one or more of the following features. For example, the first code segment may include a fourth code segment for prioritizing the potential members based on a relevance or availability of the potential members with respect to the issue, and a fifth code segment for inviting the potential members to the virtual community, based on the prioritization. The first code segment may include a fourth code segment for filtering the potential members based on a relevance or availability of the potential members with respect to the issue, to thereby determined filtered potential members, and a fifth code segment for inviting the filtered potential members to the virtual community.

A fourth code segment for disbanding the virtual community upon resolution of the issue may be included. A fourth code segment for monitoring communications between members of the virtual community, in order to track the issue, may be included. A fourth code segment for allowing the first or second user to invite a third user to join the virtual community may be included.

DESCRIPTION OF DRAWINGS

FIGS. 12A-12F are illustrations of an adaptive virtual community.

DETAILED DESCRIPTION

Figure 1:
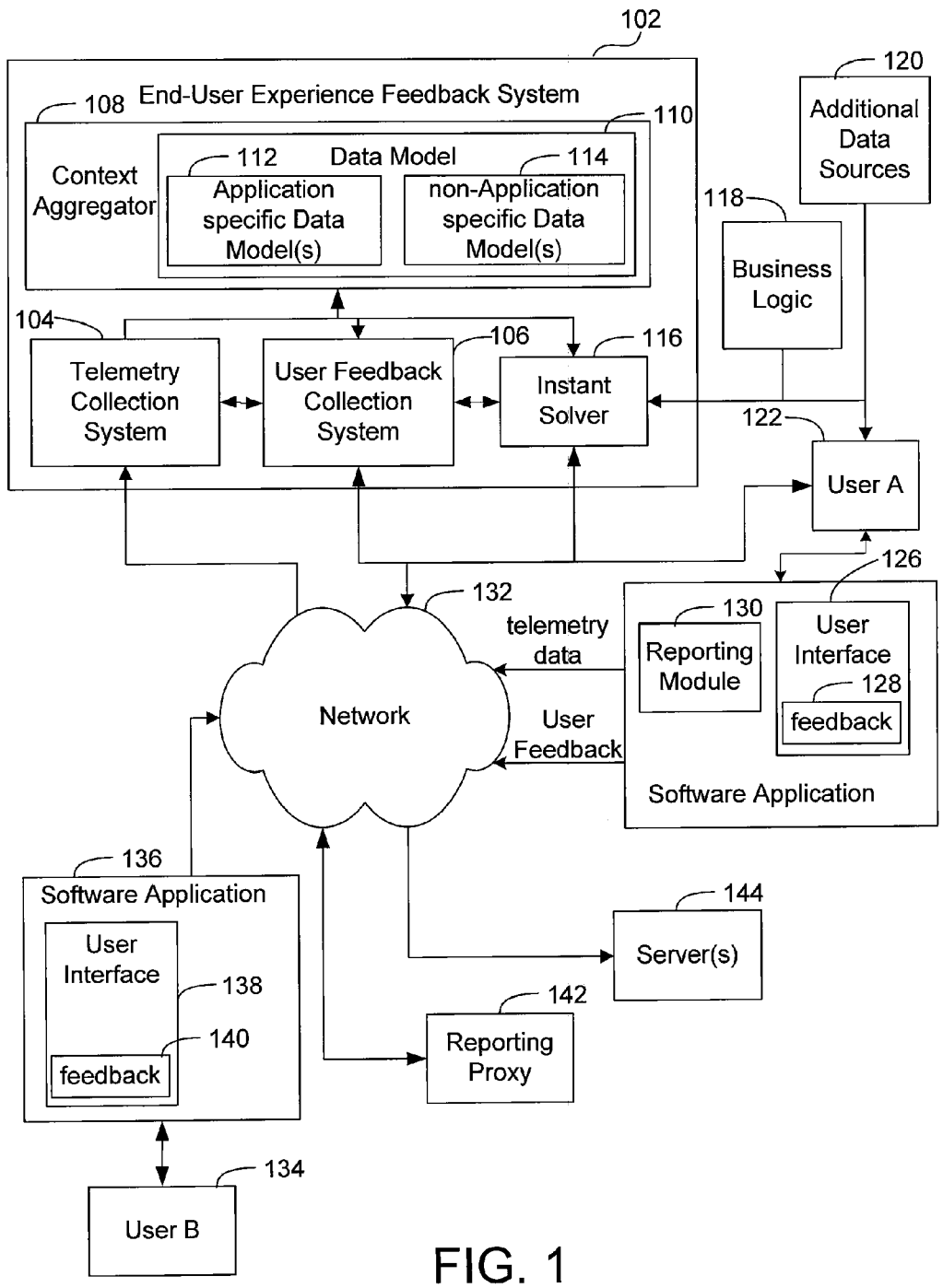
FIG. 1 is a block diagram of an end user experience feedback system.

FIG. 1 is a block diagram of an end user experience feedback system 102, also referred to herein as feedback system 102 or user feedback system 102. The feedback system 102 includes a telemetry collection system 104 and a user feedback collection system 106. A context aggregator 108 collects data from both the telemetry collection system 104 and the user feedback collection system 106, and constructs a data model 110 that characterizes the data. Using this data model 110, as explained in more detail below, the feedback system 102 is able to provide software support in a timely, convenient, and useful way.

More specifically, the telemetry collection system 104 is responsible for receiving a stream of data that provides real-time information about a technical environment of a user, such as, for example, a software application being used by the user, a local system running the software application, or systems interacting with the local system. This data stream may include, for example, system performance benchmarks (e.g., performance speed or system response time), exception reports, or error messages. The data stream may further include, for example, current use data such as an identification of a server (e.g., from among a plurality of servers) being accessed by the software application, a version number of the software application, or a "snapshot" of a current working environment of the user (e.g., a current web page being accessed).

Such telemetry data may be more useful than reporting functions that only send error messages in response to an actual malfunction, or that send periodic reports/error messages. The telemetry data may provide continuous information about an environment of a user, as the user proceeds with using a software application. For example, the telemetry data may be continuously provided as the user goes through the steps of entering a purchase order, or expensing a work-related fee, or performing some other software function. In this way, the telemetry data may provide information about when, where, or why the user is experiencing a problem in using the software application.

The user feedback collection system 106, in contrast, is designed to obtain structured or unstructured feedback information that is entered actively and/or directly by a user. For example, the user feedback collection system 106 may be used to present one or more questions to the user about a problem or issue being experienced by the user. The user may respond by selecting from a list of possible answers, and/or by inputting unstructured feedback (e.g., a written description of a problem). The user feedback collection system 106 may thus provide specific information about a particular problem, or may narrow the problem to within a defined range or selection of possible problems or class(es) of problems.

As referred to above, the context aggregator 108 may then combine the telemetry data collected by the telemetry collection system 104 with the user input collected by the user feedback collection system 106 to construct the data model 110 describing a context of a particular user. That is, the data model 110 describes the particular circumstances or setting of a user and software application, as the user uses that software application. The context of a user might refer to the user's technical context (e.g., type of application(s) and/or system (s) being used), as well as the user's business context (e.g., the user's place in a business process, such as, for example, an accountant entering expense information into an expense management application). As such, and as discussed in more detail below, the data model 110 provides a basis by which a shortcoming or perceived shortcoming of the software application may be identified and/or resolved for a particular user.

In FIG. 1, the context aggregator 108 constructs the data model 110 having an application specific data portion 112 and a non-application specific portion 114. As should be apparent, the application specific portion 112 contains information pertaining to a particular software application being used by a user. In contrast, the non-application specific portion 114 contains information that is not particular to a given software application, such as, for example, information related to the user (e.g., a user identifier, general system information about the user's computer system, or a location or language of the user).

Where feasible, the context aggregator 108 compiles the data model using a pre-determined, standardized format. That is, pieces or types of information included in the data model 110 are associated with a pre-determined format, with pre-determined units, and/or with respect to a pre-determined point of reference. For example, location information may be stored using latitude/longitude coordinates, while time may be measured in milliseconds. Similarly, a language being used by a user and application may be designated in a pre-determined manner (e.g., languages English, German, or French may be abbreviated according to a standard abbreviation format). As another example, a name or abbreviation for a particular software protocol or procedure may be pre-selected.

In particular, the context aggregator 108 uses a pre-defined timeline or point of reference for tracking a timing of an event. For example, the context aggregator 108 may time-stamp each piece of data received from the telemetry collection system 104 and the user feedback collection system 106 (or the time stamps may be applied at the telemetry collection system 104 and the user feedback collection system 106 themselves). In this way, even though the data may be collected from distinct, asynchronous sources (e.g., from both a server and a client computer, or from two different users), and even though the data may include data of different types (e.g., the telemetry data as compared to unstructured feedback from the user), the context aggregator 108 is able to make a judgment about a timing or sequence of events of the data.

In practice, it should be understood that the context aggregator 108 may construct multiple data models for any or every user of the feedback system 102. Since, as just described, these data models each contain words and designations that have the same meanings, regardless of the source from which the particular values were obtained, the different data models may be meaningfully compared and analyzed, across a wide range of users and applications, to thereby improve the software application(s).

A solver 116 is included in the feedback system 102 that analyzes the data model(s) 110 and determine an appropriate response. For example, the solver 116 may determine a solution to a problem being experienced by a user, or, at a minimum, may identify a cause of the problem.

In determining a solution or identifying a cause, the solver 116 has various resources at its disposal. For example, the solver 116 has access to many or all of the data models 110 produced by the context aggregator 108, and may analyze these data models 110 to arrive at a conclusion. For example, the solver 116 may examine multiple data models 110 and determine that users of different software applications who are in a particular location and accessing a particular server are experiencing slow performance. Based on this information, the solver 116 may determine that the source of the slow performance is related to a given server, and not to a particular application, whereupon the solver 116 may relay this information to the user(s). It should be understood that the standardization of data models 110 across multiple users and applications facilitates this determination on the part of the solver 116.

Additionally, the solver 116 may have access to other components or resources to assist in the process of improving a software application and/or user experience. For example, the solver 116 may access business logic 118, which represents, for example, a conventional, rule-based set of definitions for a business process. The business logic 118, for example, may define a timing or sequence of business events or transactions, or may define business pre-requisites for use of a software application. As one example, the business logic 118 may require that shipment of goods occurs only after payment is received, so that a "shipping" software application may only be used once an order has been entered and paid for.

The solver 116 also may have access to additional data sources 120, generically represented in FIG. 1 and referring to, for example, a geographic location of a user or server, network status conditions, application product manuals, a workflow engine, or any other information that may be useful to the solver 116 in identifying or resolving software-related issues.

In operation of the end user experience feedback system 102, then, a user A 122 uses a software application 124 that includes a user interface 126. The user interface 126, in turn, includes a feedback button 128. The feedback button 128 may be included across a large number of interfaces, e.g., web pages, associated with a particular software application. Upon experiencing a problem or otherwise wishing to express feedback, the user A 122 selects the feedback button 128.

At this point, a reporting module 130 integrated with the software application 124 may begin transmitting telemetry data to the telemetry collection system 104. For example, if the user interface 126 is a web page, the reporting module 130 may include a Java script for, for example, measuring and reporting a response time of the web page. At approximately the same time, the user feedback collection system 106 presents a question or series of questions to the user A 122, perhaps using the user interface 126 (or a separate interface, not shown in FIG. 1).

Both channels of information may thus be provided to the feedback system 102, for example, over a network 132. The network 132 may be, for example, a local area network (LAN), or a wide area network (WAN), such as the public Internet. The network 132 may be freely available, or may be limited to an enterprise or other network provider. Of course, it is also possible that the software application may be directly connected to the feedback system 102, without use of the network 132. Further, in some implementations, some or all of the functionality of the feedback system 102 may be integrated within the software application 124.

In other implementations, very little of the functionality for using the feedback system 102 need be integrated with the software application (e.g., the reporting module 130 may be omitted). For example, a user B 134 of an application 136 having a user interface 138 may have only a feedback button 140 integrated with the application 136 for using the feedback system 102. Upon selecting the feedback button 140, a proxy 142 intercepts or eavesdrops on communications from the application 136, and transmits this data to the telemetry collection system 104 as the telemetry data. For example, the proxy 142 may intercept communications between the software application 136 and a server(s) 144, such as a request for a particular web page associated with the application 136.

Based on the above, it should be understood that the feedback system 102 collects data from multiple users 122, 134, who may be using the same or different software applications 124, 136. The data may include data from the additional data sources 120, which may provide data that are relevant to the context of a user but that may not be stored in the software applications 124, 136. In this case, the additional data sources 120 may (or may not) be local to, for example, the user A 122.

The feedback system 102 compiles standardized data models 110 that include information about the users 122, 134 and software applications 124, 136, and uses the data models 110 to analyze information about the users 122, 134 and application(s) 124, 136. In this way, the feedback system can, for example, consider a proposed improvement, diagnose a shortcoming, or present a solution to a problem of the application(s) 124, 136.

In some settings, then, a user may obtain a solution to problem immediately, such as when the solver 116 is able to present a solution, perhaps selected by the solver from one of a number of known solutions for an identified problem, directly to the user. In these cases, the user receives a solution in a minimum amount of time, without having to interact with support staff, and without having to know more than a minimal amount about his or her own technical environment (for example, the user need report little, if any, system information, since such information would typically be included in the telemetry data).

When the solver 116 is unable to present satisfactory information or resolution to, for example, the user A 122, the solver 116 may act to create an adaptive virtual community for assisting the user A 122. That is, the solver 116 may identify other users who have particular expertise or knowledge of the issue presented by the user A 122, and may facilitate communication between those users and the user A 122, whereby the user A 122 may be made aware of a solution in a timely and convenient manner.

For example, the solver 116 may have awareness (from the data model 110) that the software application 136 is an earlier version of the software application 124, and that the user B recently interacted with the feedback system 102 on precisely the same issue being raised by the user A 122. In this case, even though the software applications 124 and 136 are different versions, the solver 116, using the appropriate data models 110, may determine that the same issue exists in both versions. Moreover, even though the user B 134 may have raised this issue at an earlier time and may not even currently be using the software application 136, the solver 116 may provide contact or other communication information to the user A 122 for communicating with the user B 134.

Although one example of a user feedback system is described above with respect to FIG. 1, it should be understood that many other implementations also may be used. For example, although the feedback buttons 128, 140 are shown above for instigating transmission of telemetry data, it should be understood that the telemetry data may be instigated by some other cause, such as a software malfunction, or may be started on a periodic basis. Further, although the telemetry data is described above as a stream of data that is transmitted continuously, it should be understood that the term telemetry data also may include intermittent or interrupted transmissions of data.

Based on the description of FIG. 1, it should be understood that the feedback system 102 provides benefits to virtually all parties associated with the use or provision of software applications. For example, the users 122 and 134 may experience software support that is provided quickly and conveniently. Employers who provide software in the workplace may reduce service and training costs, and may increase employee satisfaction and productivity by minimizing a time necessary to discover and correct software malfunctions or other shortcomings. Further, employers may benefit from increased and more efficient usage of deployed software applications, which, in turn (and particularly with the use of adaptive virtual communities), may result in an accumulation of shared knowledge and best practices among employees.

As a final example of benefits provided by a system such as the feedback system 102, producers of software applications, as discussed in more detail below, may be given access to data models 110 constructed by a plurality of context aggregators 108, perhaps across multiple providers (e.g., may have access to feedback systems 102 used by multiple employers or enterprises deploying the software). In this way, the software producers may quickly identify and respond to software problems, as well as identify usage trends and determine new product and product sales opportunities. Additionally, the software producers may be able to efficiently manage allocation of resources for responding to customer problems, including the use of targeted training offerings to users.

Figure 2:
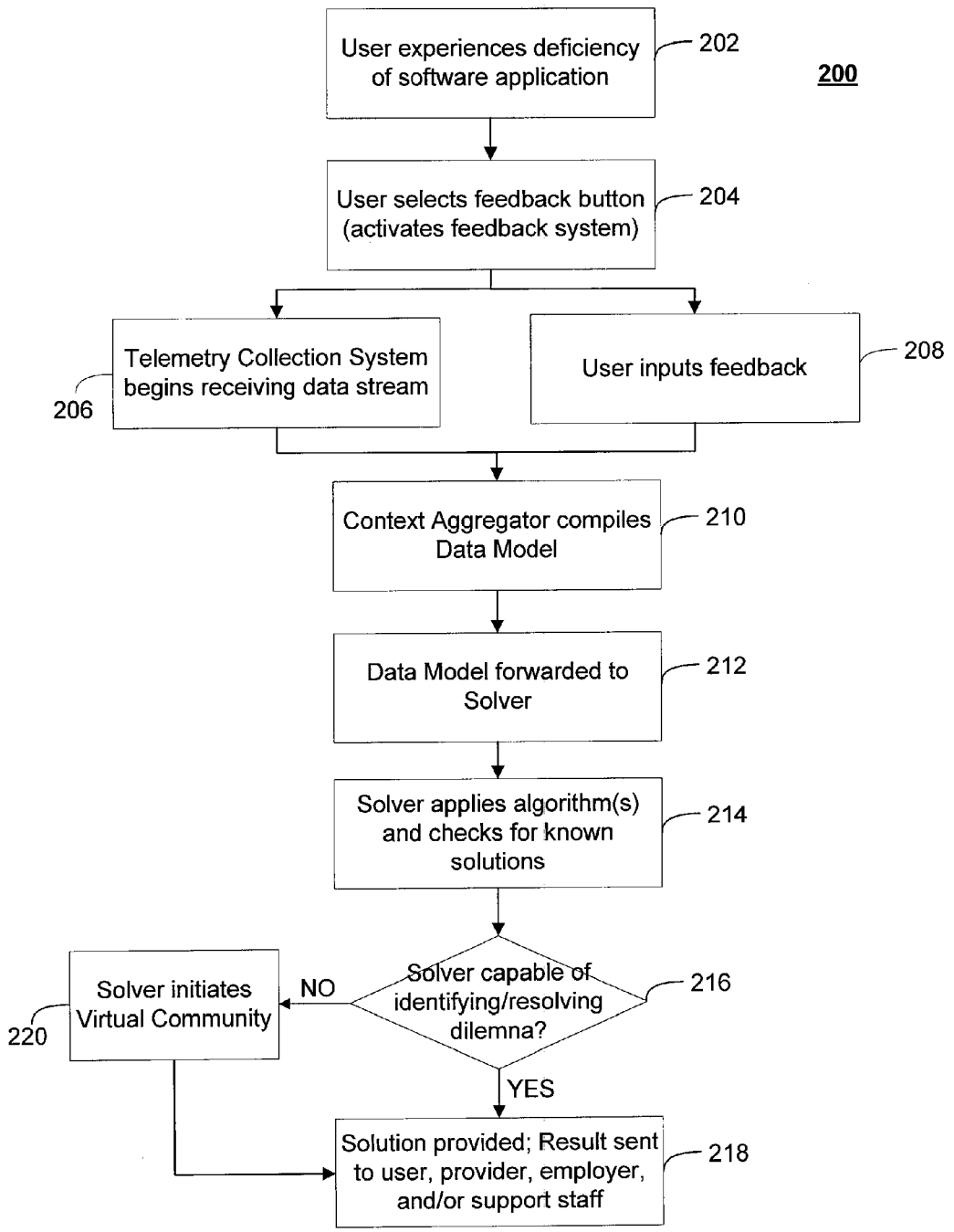
FIG. 2 is a flowchart illustrating an operation of the end user experience feedback system of FIG. 1.

FIG. 2 is a flowchart 200 illustrating an operation of the end user experience feedback system of FIG. 1. In FIG. 2, the operation begins when a user experiences a deficiency of a software application (202). Such a deficiency may include an actual malfunction of the application. However, the deficiency also may include a perceived shortcoming or area of potential improvement that a user, e.g., the user A 122, has identified.

In response to the deficiency, the user A 122 activates the feedback system 102 by selecting the feedback button 128 (204). At this point, the telemetry collection system 104 begins collecting telemetry data (206) transmitted by the reporting module 130 (or, in the case of the user B 134, intercepted by the reporting proxy 142). At the same time, the user feedback collection system 106 provides the user A 122 with an opportunity to provide feedback, and collects the response (208).

The context aggregator receives both channels of information from the telemetry collection system 104 and the user feedback collection system 106, and compiles a data model 110 (210). The data model 110 is then forwarded to the solver 116 (212). As explained above, the solver 116 thus has access to information about a current context of the user A 122, so that the solver 116 is aware of pertinent information about the technical circumstances and setting being experienced by the user A 122.

The solver then applies an appropriate algorithm(s) and/or checks known solutions for the issue at hand (214). The solver may access the appropriate business logic 118 or whatever other additional data sources 120 that are available to recognize or solve an identified issue. Additionally, the solver 116 may compare the data model to various other data models stored within, or in association with, the context aggregator 108, in order to diagnose a problem and/or determine a solution.

If the solver 116 is capable of identifying and/or resolving the issue (216), then the solver 116 provides the solution to the user (218). At this time, the result of the above described operation also may be provided to other parties, such as, for example, the software producer, the software provider (e.g., an employer), or software support staff.

In some cases, the solver 116 may determine that the problem perceived by the user A 122 is not related to the software application at all. For example, the solver 116 may determine that a slow application performance perceived by the user A 122 is related to an application server being accessed by the application. In such cases, it may be the case that the user A 122 is satisfied merely with having identified a cause of a perceived problem. Also in such cases, the determination and transmission of such information by the solver 116 may, at a minimum, serve to deflect wrongful blame for inadequate application performance that may otherwise be directed by the user toward a software provider or producer.

If the solver 116 is not capable of identifying or resolving the issue (which may be determined by the solver 116 itself or by the user A 122), or if the user A 122 simply wishes to discuss the issue in more detail, then the solver 116 initiates an adaptive virtual community (220). That is, the solver 116 may forward a message to another user (e.g., the user B 134) that a fellow user is in need of assistance, and establish an appropriate medium for communication, such as, for example, instant messaging, e-mail, or a phone connection (e.g., voice-over IP (VoIP)). As before, a result of such communication may be monitored or forwarded to appropriate parties (218).

Figure 3:
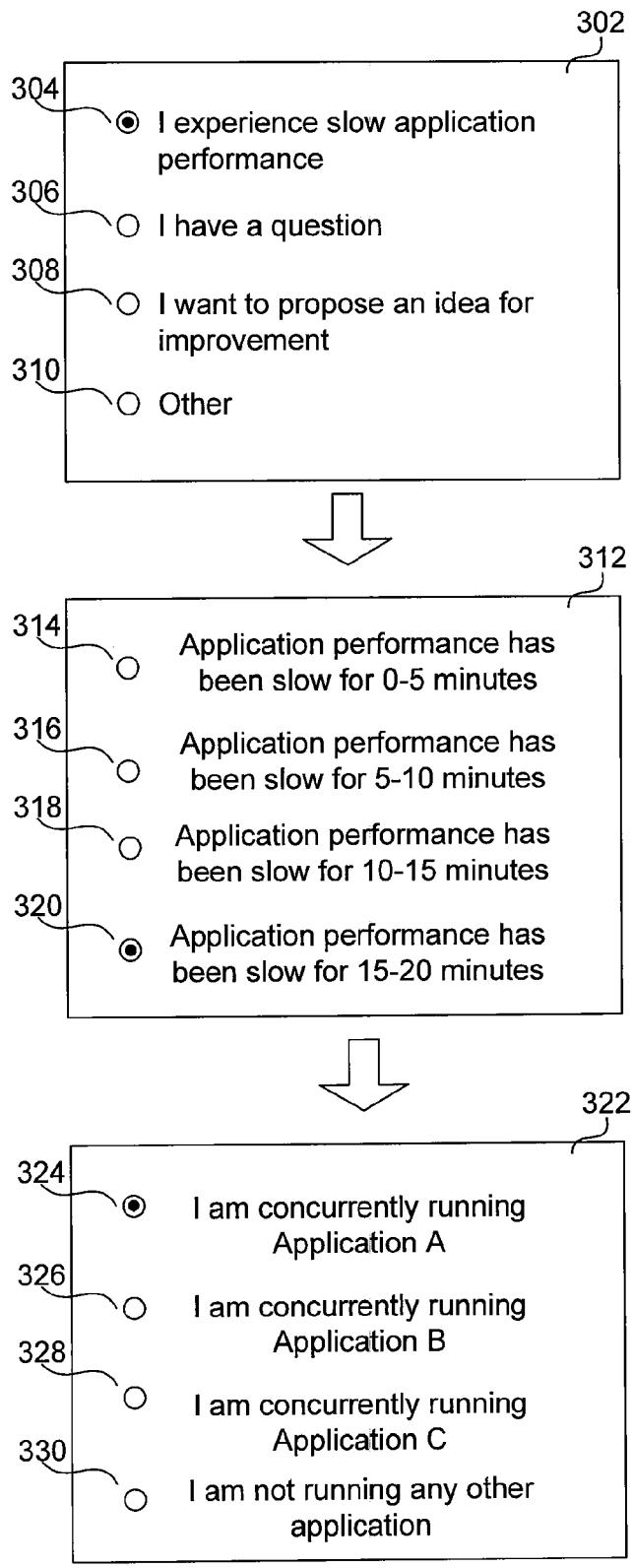
FIG. 3 is a series of interface windows used by the end user experience feedback system of FIG. 1 to collect user feedback.

FIG. 3 is a series of interface windows used by the end user experience feedback system 102 of FIG. 1 to collect user feedback. That is, FIG. 3 represents one possible technique by which the user feedback collection system 106 may interact with the user A 122 (208).

In FIG. 3, the user feedback collection system 106 presents a (first) window 302 to the user A 122. The window includes a number of choices, one or more of which may be selected by the user A 122. Specifically, the window 302 includes a first choice 304 of "I experience slow application performance," a second choice 306 of "I have a question," a third choice 308 of "I want to propose an idea for improvement," and a fourth choice 310 of "other." The window 302 may be a part of, or separate from, the user interface 126 of the application 124.

The window 302 may be a high-level, generic window that is presented to any user requesting assistance (e.g., selecting the feedback button 128). Alternatively, the window 302 may be tailored to an individual user's environment. That is, some or all of the choices 304, 306, 308, 310 presented to the user A 122 may be altered on an as-needed basis.

Such tailoring of the window 302 may occur, for example, in response to telemetry data, if such telemetry data is collected for a short time prior to presenting the window 302, or if telemetry data is available from a previous request by the user A 122. As another example, the tailoring of the window 302 may occur based on knowledge of the user feedback collection system 106 that has been obtained from other users, i.e., from data models 110 previously constructed by the context aggregator 108. In the latter case, it should be understood that the standardized nature of the data model(s) 110 with respect to the various users, as explained above, facilitates the necessary sharing of information.

For example, the context aggregator 108 may have recently constructed a data model for the user B 134. Based on this data model, the solver 116 may have determined that a particular server, such as the server 144, may be over-burdened by a large number of users, and is therefore running slowly. Based on this knowledge, the user feedback collection system 106 may include the first choice 304 of "I experience slow application performance" in the window 302.

If, as in FIG. 3, the user A 122 selects the first choice 304, then the user feedback collection system 106 may present a second window 312. The second window 312 may be formulated by the user feedback collection system 106 based on the knowledge that the server 144 has only been appreciably slowed for the past 10 minutes. Therefore, the second window 312 presents a first choice 314 of "application performance has been slow for 0-5 minutes," a second choice 316 of "application performance has been slow for 5-10 minutes," a third choice 318 of "application performance has been slow for 10-15 minutes," and a fourth choice 320 of "application performance has been slow for 15-20 minutes."

In FIG. 3, the user A 122 has selected the fourth choice 320 of "application performance has been slow for 15-20 minutes." From this selection, the user feedback collection system 106 may determine that the user A is experiencing an issue that is unrelated to (or in addition to) a slow operation of the server 144, since the problem has existed before the slowed operation of the server 144. Note that the user feedback collection system 106 also may determine that the user A 122 is or is not connected to the server 144 (or when the user A 122 was connected to the server 144) based on the telemetry data that is concurrently being collected by the telemetry collection system.

Finally in FIG. 3, the user feedback collection system 106 presents a third window 322 to determine whether system performance is being affected (slowed) due to concurrently running applications. Accordingly, the third window 322 includes a first choice 324 "I am concurrently running Application A," a second choice 326 "I am concurrently running Application B," a third choice 328 "I am concurrently running Application C," and a fourth choice 330 "I am not running any other application." It should be understood that the user A 122 may be able to select more than one of the choices 324, 326, or 328.

In some settings, some or all of the information collected by the windows 302, 312, and 322 may be collected as part of the telemetry data. In these settings, a need for one or more of the windows 302, 312, and 322 may be obviated, or may be redundant to the telemetry data (but may nonetheless useful in targeting specific user concerns and/or constructing the data model 110).

In any case, the purpose of windows 302, 312, and 322 is merely to illustrate the capability of the user feedback collection system 106 to progressively and intelligently collect information from the user A 122, by constructing such windows in a manner that is individually suited to each particular user. In some implementations, the user feedback collection system 106 may use an expert system or other artificial intelligence techniques for determining such a series of individually-suited questions (windows). For example, the user feedback collection system 106 may determine content of a feedback window by calculating the highest probability of a problem, based on previous questions asked.

Generally, the user feedback collection system 106 may progressively create user feedback windows 302, 312, and 322 by using, for example, responses of the user to a previous window, the telemetry data, a partial or whole data model constructed by the context aggregator (including data models constructed for other users), and information that may be available from the solver 116. Additionally, the user feedback collection system 106 may use information from the business logic 118, or from any of the available additional data sources 120.

For example, the application 124 of the user A 122 may be a customer relationship management application having a certain version number. The user A 122 may experience that all currency is shown in euros, and may wish to show currency in dollars. However, the technique for performing this switch may not be readily apparent in the particular application, causing the user A 122 to activate the feedback system 102. The feedback system 102 may already be aware of this issue for this application and version, based on interaction with other users (e.g., based on other users' constructed data models). As a result, the user feedback collection system 106 may include a question about this issue in the window 302 or a later window.

As another example, the application 124 of the user A may be a generally stand-alone application, such as, for example, a word-processing application or a spreadsheet application. Such an application may make use of a plug-in module or application program interface to report events (e.g., to act as the reporting module 130), in response to selection of the feedback button 128. For example, events such as a creation of a new document or the running of a macro may be transmitted as part of the telemetry data to the telemetry collection system 104.

It should be understood that in the implementation of FIG. 1, the purpose of the user feedback collection system 106 and the windows 302, 312, and 322 is not, by themselves, to diagnose and solve a problem of a user. Rather, as explained herein, the user feedback collection system 106 is typically used more to classify or identify a problem area, while an actual diagnosis and/or solution is generally determined, if at all, by the solver 116, based on the data model 110 that the context aggregator 108 constructs using both the telemetry data and the user feedback. Nonetheless, it is possible in some implementations that low-level, simple problems of a user may effectively be diagnosed by the user feedback collection system 106.

Figure 4:
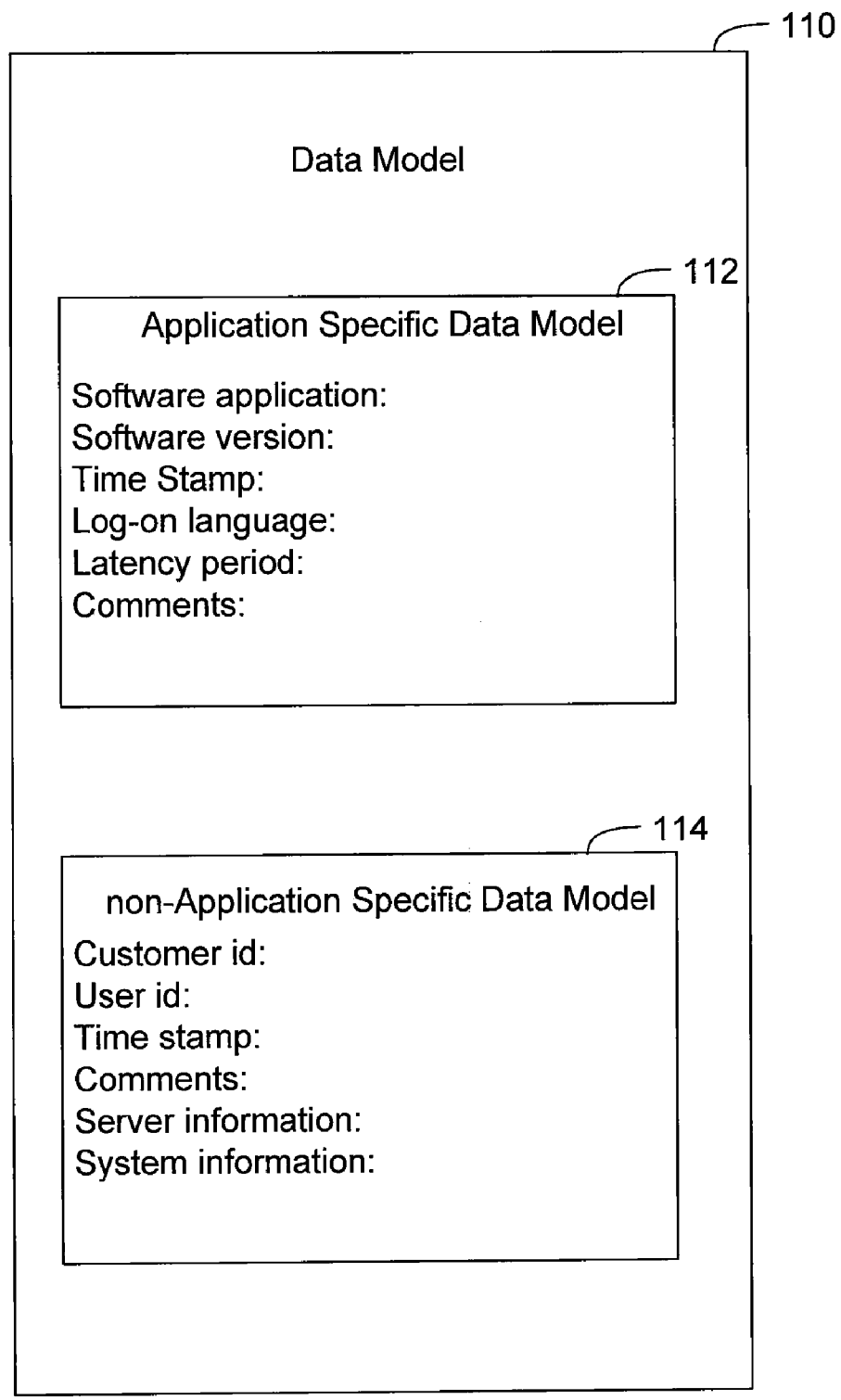
FIG. 4 is a block diagram of a data model constructed by the end user experience feedback system of FIG. 1.

FIG. 4 is a block diagram of the data model 110 constructed by the end user experience feedback system 102 of FIG. 1. The data model 110 may be formed for a particular user over a particular time period, so that the data model 110 may generally have a validity period that is defined by, for example, the time from an earliest received time-stamp to a last-received time stamp. Data models that have past their validity period(s) may be stored in a data model database, not shown in FIG. 1, for later access by, for example, the solver 116. In other implementations, data models may be (continually) updated, rather than stored in a static form.

As referred to above, the data model 10 includes the application specific portion 112 and the non-application specific portion 114. The application specific portion 12 includes such information as, for example, an identification of the software application and its version, a time stamp on each piece of collected information, a log-on language used by the user, a latency period of functionality or reporting of the application (e.g., the telemetry data, as reported, may lag behind real-time by a certain, known amount), and application-specific comments of the user.

Meanwhile, the non-application specific portion 114 includes customer (e.g., provider) and user identifiers, a time stamp for collected information, non-application specific comments of the user, server-specific information, and system-specific information. Of course, the above listings are merely examples, and it should be understood that the portions 112 and 114 may contain many other pieces or types of information.

Moreover, it is not necessary that the data model 110 should split into the portions 112, 114; rather, the data model 110 may be formed integrally to include all relevant information for a particular user over a particular time period. However, the organization of the data model 110 of FIG. 4 may facilitate its construction and use, as well as the construction of future data models. As one example, certain non-application specific information included in the portion 114 may apply to multiple software applications used by a particular user, so that this information need not be collected multiple times when building multiple data models (e.g., data models for different software applications for the same user). Further, it should be understood that the portions 12 and 14 of the data model 110 of FIG. 4 may both include telemetry data as well as user feedback data.

Figure 5:
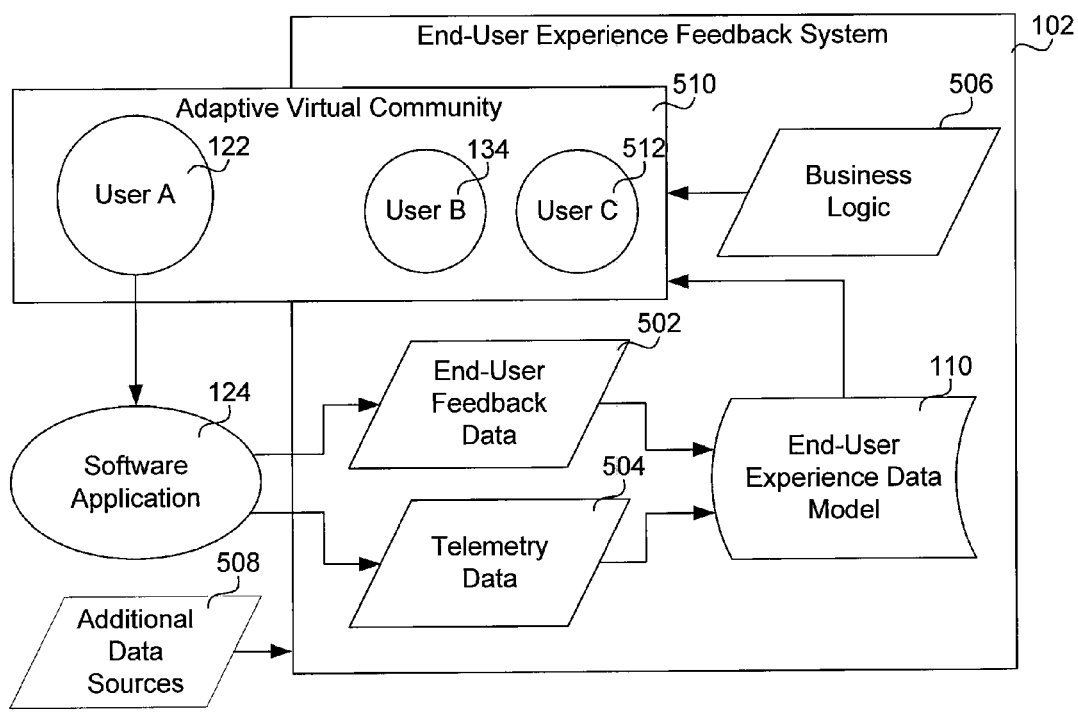
FIG. 5 is a block diagram of an operational state of an implementation of the end user experience feedback system of FIG. 1.

FIG. 5 is a block diagram 500 of an operational state of an implementation of the end user experience feedback system of FIG. 1. In FIG. 5, the user A 122 has experienced a problem such that the software application 124 transmits user feedback data 502 and telemetry data 504 that are used to formulate the data model 10. Further in FIG. 5, the data model 110 and a specific set of rules of business logic 506 and additional data 508 are used (by the solver 116) to initiate an appropriate adaptive virtual community 510, which includes the user A 122, the user B 134, and a user C 512.

The adaptive virtual community 510 thus includes users who are automatically and dynamically assigned, based on similarities in their technical or business (process) contexts. The extent to which these similarities currently exist (or recently existed) between any pair or group of users may be identified, defined, and/or prioritized, so that, in FIG. 5, users 134 and 512 are determined to be the most likely users to be able to assist the user A 122.

Since the adaptive virtual community is formed based on a context of the user A 122, there may be many types or categories of other users who may be determined to be included in the community 510. For example, the user A 122 may be a newly-hired account manager trying to execute a purchase order entry in the application 124. In this case, the user B may be another account manager, who happens to have recently completed the same (type of) transaction. The user C 512 may be an accountant at the same company who has expertise from a business perspective in entering purchase orders, or may be a member of a technical support staff with expertise in running the application 124.

In short, the adaptive virtual community 510 is created on an as-needed basis, and members 134 and 512 are selected based on a determination that they are likely to be able to assist the user A 122. Once the issue of the user A 122 has been resolved, the adaptive virtual community may be immediately disbanded. Further discussion and examples of adaptive virtual communities are provided below.

Figure 6:
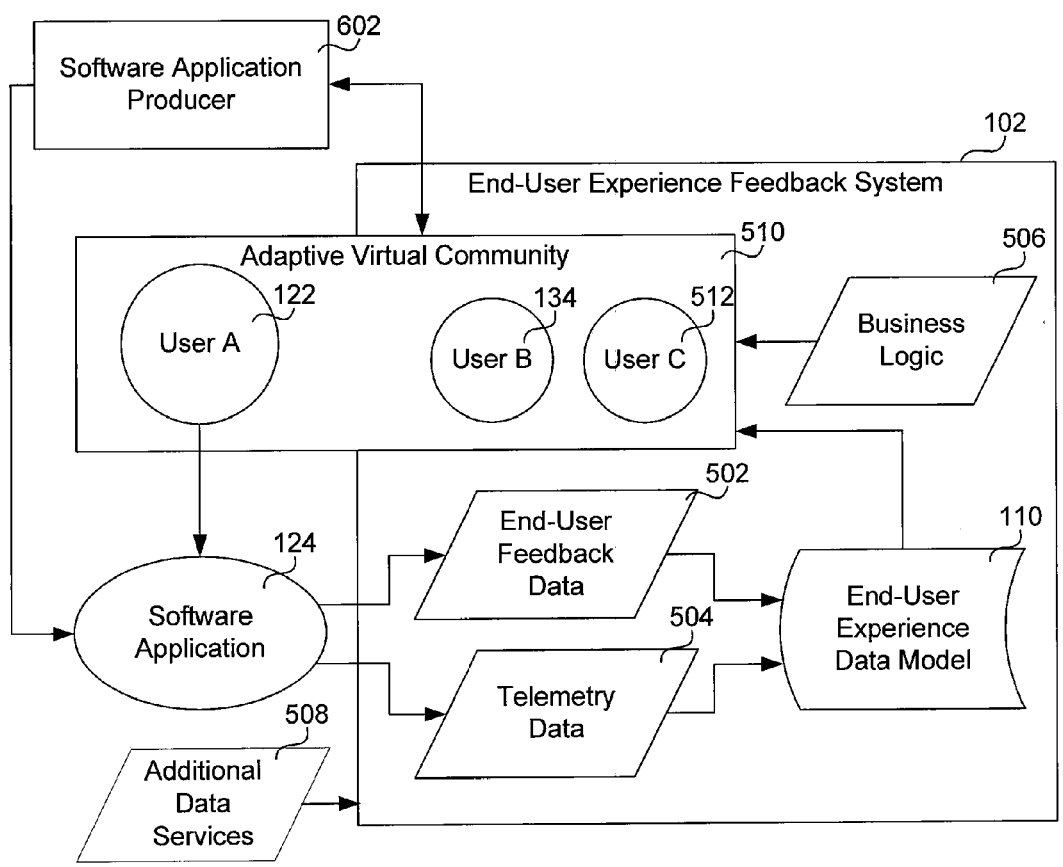
FIG. 6 is a block diagram of an operational state of the implementation of FIG. 5 showing a first interaction of a software producer.

FIG. 6 is a block diagram of an operational state of the implementation of FIG. 5 showing a first interaction of a software producer 602. Specifically, in FIG. 6, it is assumed that the adaptive virtual community 510 has been dynamically created in the manner described above. In such a virtual community, members 122, 134, and 512 have the ability to extend an invitation to a party that was not included in the virtual community by action of the solver 116. For example, the members 122, 134, and 512 may agree to invite software support personnel to join the community, in order to resolve a particular issue.

In FIG. 6, the members 122, 134, and 512 invite (a representative of) the software application producer 602. The software producer 602 may obtain access to the application 124 as it is running, and/or may gain access to the relevant data model(s) 110 created by the context aggregator 108. As a result, the software producer 602 may receive specific comments and suggests from the members 122, 134, and 512 and rapidly implement repairs or improvements to the application 124.

Moreover, the software producer 602 may thereafter easily and quickly validate the effectiveness of the repaired or improved software application, by, for example, monitoring the data models created by the context aggregator(s) 108, or participating in further adaptive virtual communities. Also, the adaptive virtual community 512 represents a potentially excellent marketing opportunity for the software producer 602, since the members 122, 134, and 512, by definition, have certain well-defined interests and abilities with respect to the application 124.

Figure 7:
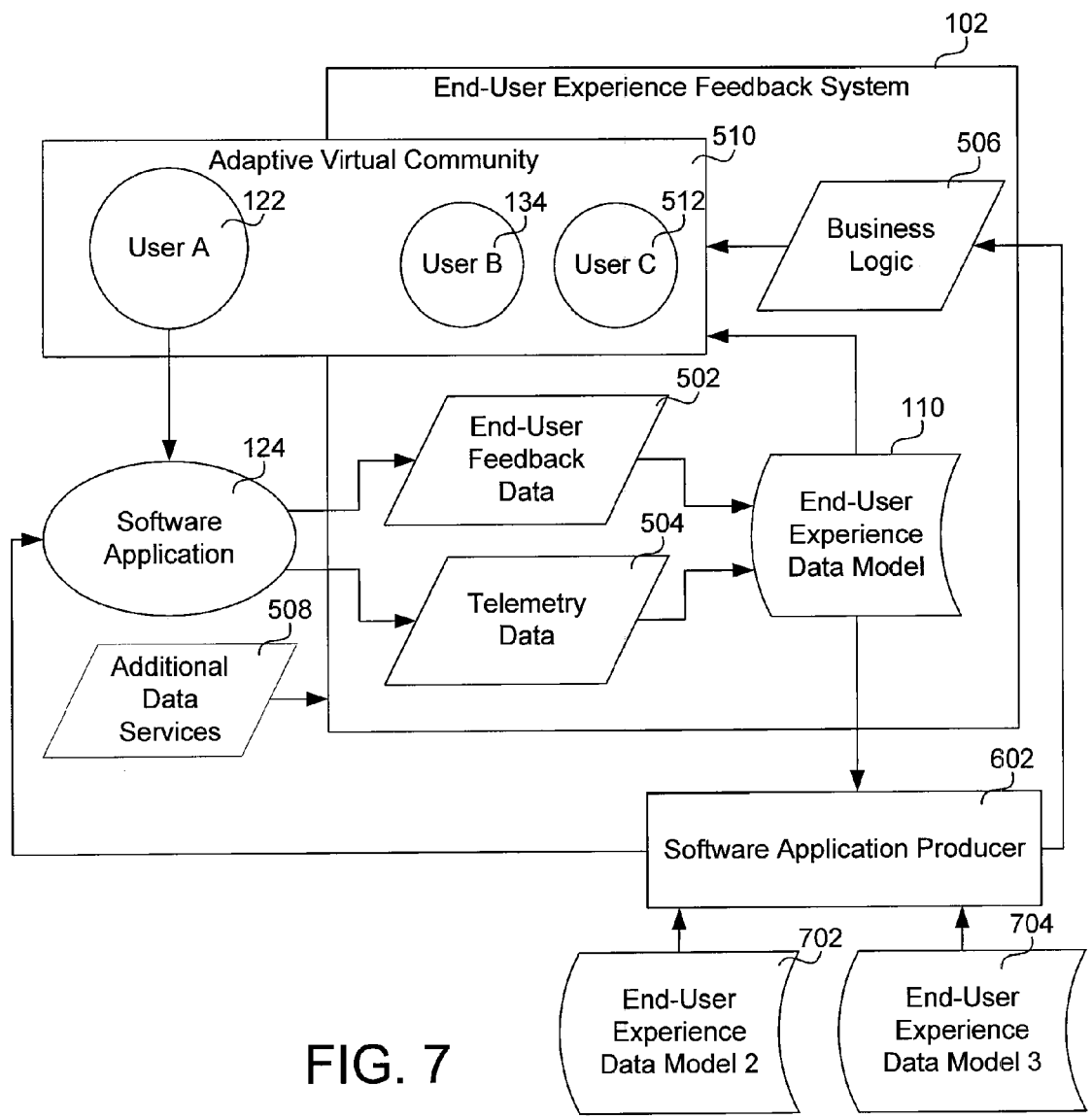
FIG. 7 is a block diagram of an operational state of the implementation of FIG. 5 showing a second interaction of a software producer.

FIG. 7 is a block diagram of an operational state of the implementation of FIG. 5 showing a second interaction of the software producer 602. In FIG. 7, the application producer 602 is illustrated as tracking and aggregating user experience data across a data model 702 and a data model 704, as well as the data model 110, which together represent a plurality of data models, each of which may be created by different customers (e.g., software providers) of the software producer 602.

As explained above, the data models 110, 702, 704 are constructed according to a standardized format. As a result, the software producer 602 is able to make meaningful comparisons between the data models 110, 702, and 704. These comparisons may yield a broad understanding by the software producer 602 of user experiences and benchmarks of the software application 124; for example, the software producer 602 may compare across different customers, customizations, versions, or end-user populations. As a result, the software producer 602 is better able to detect, measure, understand, fix, and validate specific user issues.

For example, the software producer 602 may provide information to usability teams in order to rapidly detect usability problems and continually validate the effectiveness of fixes among a broad user population. Additionally, the software producer 602 also may provide information to product design and development teams, in order to, for example, fine-tune existing product strategies, or roll-in new user needs and product opportunities. As another example, the software producer 602 may provide information to user support teams for proactively training support personnel to address current issues being experienced by the user population, even before a specific user experiences the issue(s).

FIGS. 8A-8F are illustrations of a usability study conducted using the end user experience feedback system 102 of FIG. 1. FIGS. 8A-8F illustrate how the software producer 602 may rapidly validate an effectiveness of usability improvements in a new release of a software application referred to as "xApp ABC."

Figure 8A:
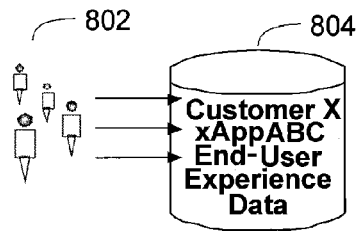
FIGS. 8A-8F are illustrations of a usability study conducted using the end user experience feedback system of FIG. 1.
Figure 8B:
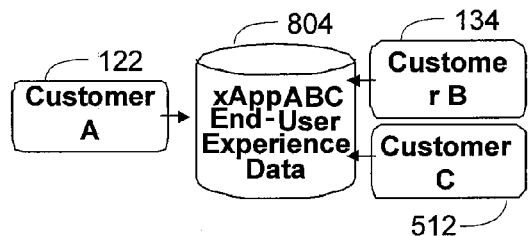

In FIG. 8A, data models are constructed for a number of users 802. In particular, in FIG. 8B and considering FIG. 7, the data models may be considered to include the data models 110, 702, and 704, which may be considered to be constructed for the three users, user A 122, user B 134, and user C 512, respectively. These data models are considered to be stored in a database 804, which may be considered to be part of one implementation of the feedback system 102. In FIG. 8B, it is considered for the sake of example that user A 122 runs the latest xApp release, while user B 134 and user C 512 run earlier releases.

Figure 8C:
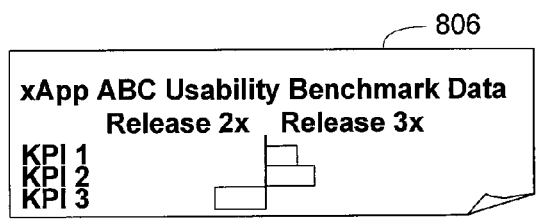
Figure 8D:
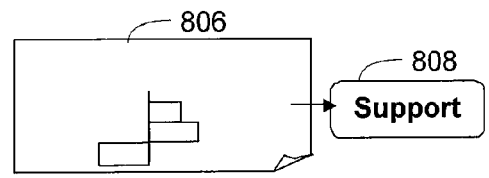

In FIG. 8C, a graph 806 may be virtually instantly created from the various data models, where the graph 806 compares usability benchmark data of users running older releases with data of users running the new release. This information (graph 806) may then be shared with support personnel for proactive training in identified problem areas, as shown in FIG. 8D.

Figure 8E:
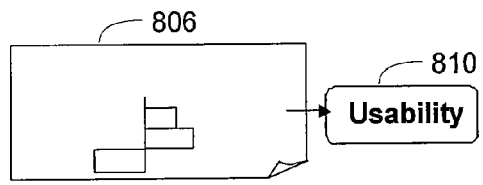
Figure 8F:
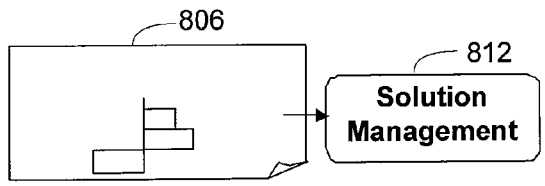

Similarly, in FIG. 8E, gathered information may be shared with usability teams for validating the success of usability improvements, as well as identifying new or remaining problem areas. In FIG. 8F, the information is shared with solution management organization for identifying new customer needs and product (marketing) opportunities.

Considering FIGS. 6, 7, and 8, it should be understood that the feedback system 102 provides the software producer 602 with a unified, standardized view of its software product, in a continuous, timely, granular fashion. Such a view may provide a substantial improvement over a fragmented, delayed view that may be provided in conventional systems, in which application data is collected, if at all, in a manner that may vary from provider to provider (e.g., across a plurality of employers who deploy the software application 124), and from user to user.

Figure 9:
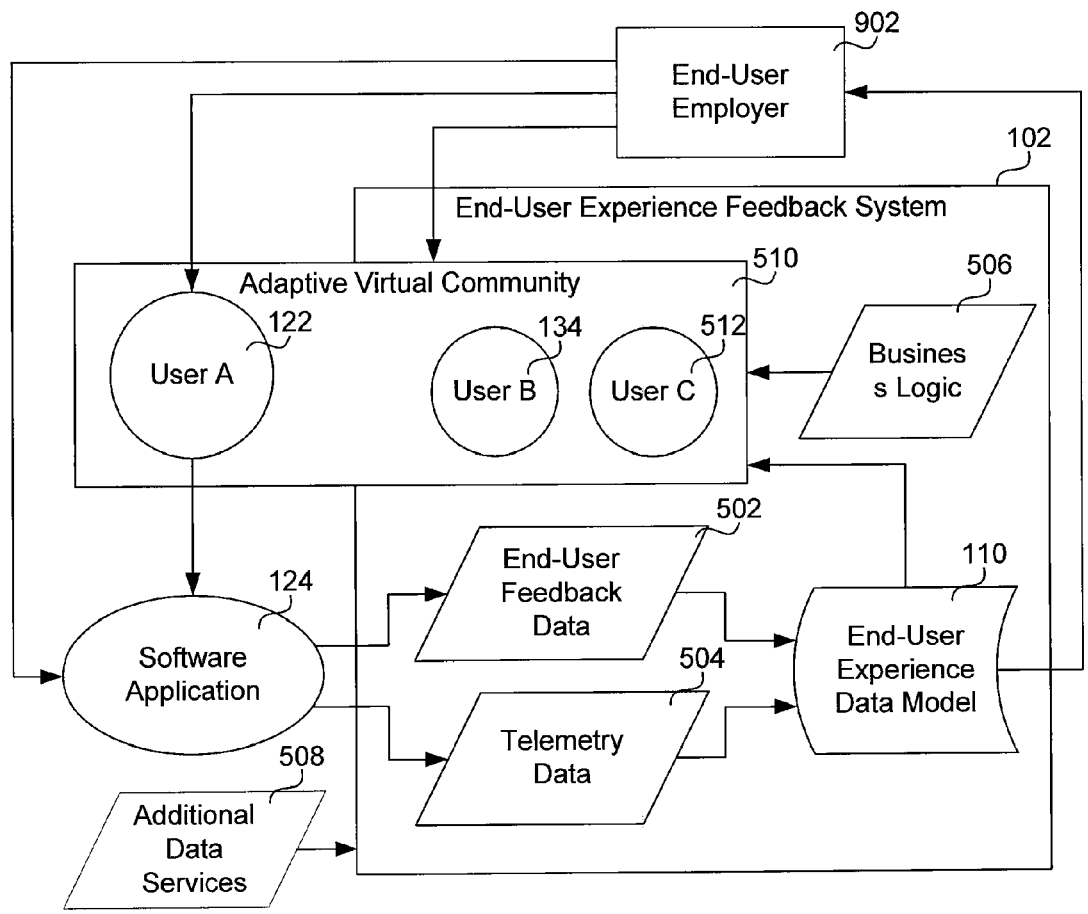
FIG. 9 is a block diagram of an operational state of the implementation of FIG. 5 showing an interaction of an end user employer.

FIG. 9 is a block diagram of an operational state of the implementation of FIG. 5 showing an interaction of an end user employer 902. In FIG. 9, the employer 902 continually monitors the data model 110 to identify problem areas across the workforce of the employer 902 when interacting with the software application 124. As a result, the employer 902 may, for example, proactively train their support personnel in order to better and faster support users, thereby leading to increased employee satisfaction and productivity, as well as an increased return on investment in the software application 124.

As shown in FIG. 9, the employer 902 also may participate, actively or passively, within the adaptive virtual community 510. In this way, for example, the employer 902 may use knowledge from the community 510 to optimize the customization and usage of the software application 124.

Based on the above, it should be understood that the end-user feedback system 102 allows for the gathering and measuring of end-user feedback and related system telemetry data in a standardized way. By relating and processing this gathered feedback and telemetry data, rapid (or pro-active), automatic end-user support may be facilitated. Such support may be advantageous to, for example, software users, providers, and producers of the software application.

Additionally, the system 102 can rapidly associate end-users with adaptive virtual communities containing other end-users that are currently working, or have recently worked, within the same application- or business process context. End-users that are part of an adaptive virtual community are enabled to use a variety of communication channels, e.g. for collectively discussing and solving current software challenges, or discussing, voting on, and refining end-user proposals or support requests.

Figure 10:
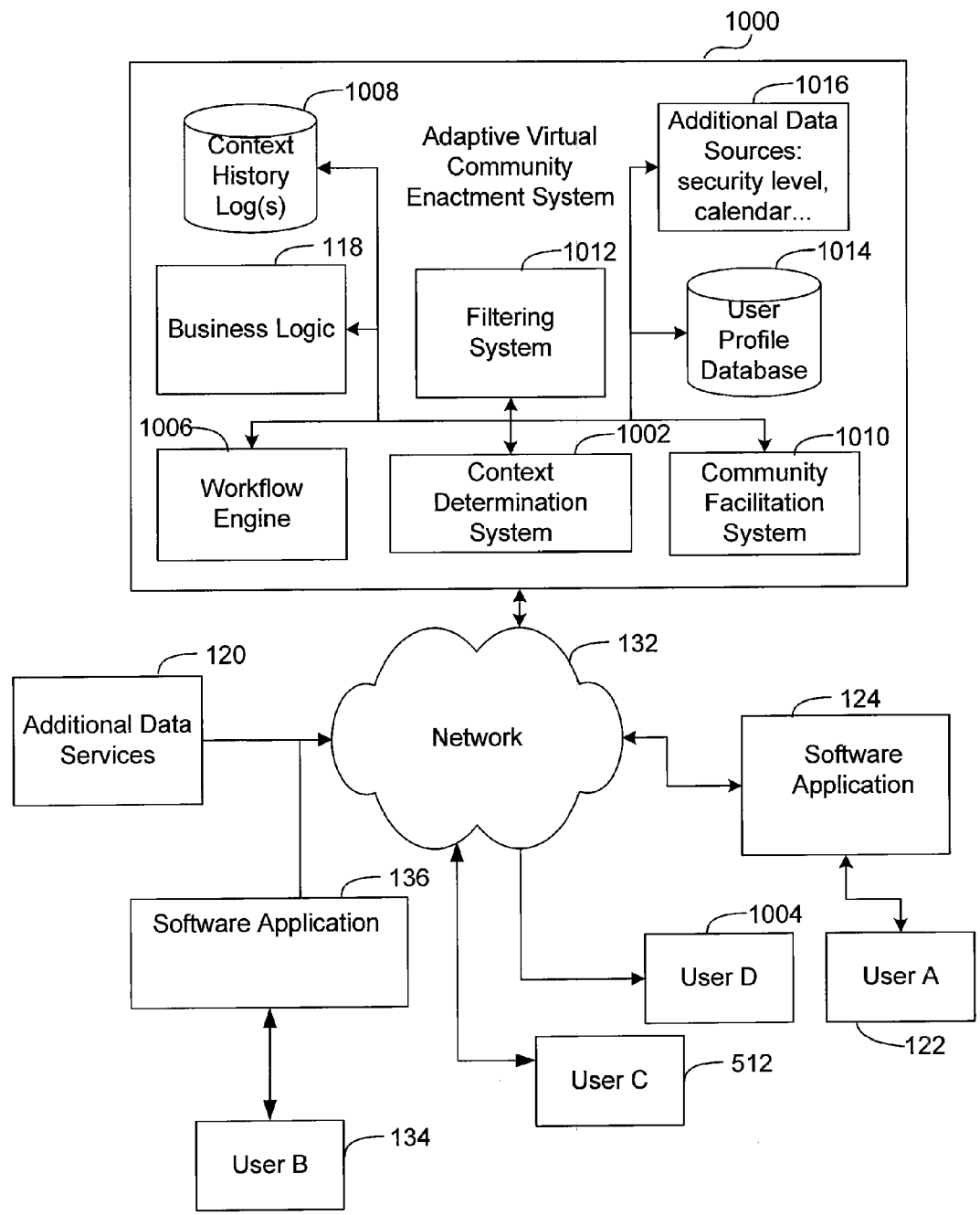
FIG. 10 is a block diagram of an adaptive virtual community enactment system.

FIG. 10 is a block diagram of an adaptive virtual community enactment system 1000. In FIG. 10, as discussed in more detail below, the system 1000 monitors or has access to a plurality of users or contact information for users (e.g., e-mail addresses). By determining a technical or business context of a particular user, the system 1000 is able to match that user with other users who are likely to be able to assist the user within that context.

Some examples of adaptive virtual community enactment systems have already been discussed above, with respect to, for example, FIGS. 1, 2, and 5-9. Specifically, adaptive virtual communities were discussed with respect to particular software applications being run by the users, where one or more of the users experiences a shortcoming or perceived shortcoming of the application(s) and wishes to discuss the shortcoming or perceived shortcoming with other users, or otherwise provide feedback concerning the software application.

However, as discussed below, the concept of adaptive virtual communities extends beyond the settings of FIGS. 1, 2, and 5-9. For example, it may be the case that a user is completely satisfied with a performance of a software application at a given time, but wishes to discuss a business transaction being tracked by the software application. As another example, an employee involved in a workflow or other business process may wish to speak with someone who works up or down the workflow. In short, numerous examples exist of situations in which a user in a particular business or technical context may wish to immediately contact another user who is likely to have expertise within the realm of that context.

Toward the goal of uniting users who are well-positioned to assist one another, the adaptive virtual community enactment system 1000 includes a context determination system 1002. The context determination system 1002 is operable to monitor, or otherwise have access to, a pool of users represented in FIG. 10 by the user A 122, the user B 134, the user C 512, and a user D 1004.

The context determination system is operable to determine a business or technical context of a particular user from among the pool of users. One example of the context determination system 1002 may include the context aggregator 108, the telemetry collection system 104, and the user feedback collection system 106 of FIG. 1. However, many other variations of the context determination system 1002 also may be used.

For example, the context determination system 1002 may include only one of a telemetry collection system and a user feedback system. As another example, the context determination system 1002 may determine a context of a particular user by accessing a workflow engine 1006 that tracks the users as they perform tasks associated with particular workflows, or by accessing the business logic component 118. The context determination system 1002 also may use periodic reports that may be sent by, for example, the software application 124. It should be understood that the context determination system 1002 may use other components, variations of the above-listed components, or any combination of the such components, in order to track or determine a context of a particular user down to a desired level of detail.

In some implementations, the context determination system 1002 may operate only in response to a particular request from a user. In other implementations, the context determination system 1002 may continually or periodically determine a context of at least some of the users within the pool of users.

As the context determination system 1002 determines contexts, context information may be tracked and stored within a context history log database. For example, with respect to FIG. 1 or similar systems, the context history log database 1008 may be used to track or store the constructed data models 110 (e.g., similarly to the database 804 of FIG. 8). However, it should be understood that the context determination system 1002 need not construct data models as described above, and may use any other defined format to store context information.

Typically, the context history logs or records within database 1008 will have some type of standardization or common factor that identifies each of them with a particular context. For example, all users associated with a particular workflow may be assigned a workflow identifier. Similarly, all users who have similar business or technical backgrounds may be assigned an appropriate identifier. For example, accountants may have a particular identifier, while account managers may have a separate identifier.

The context history logs in database 1008 may be stored with respect to a common timeline. For example, a particular workflow may have a particular timeline, along which all associated context records may be placed.

As just explained, the database 1008 is focused on the contexts of the various users, as those contexts exist at a particular time and/or change over a given time period. When a virtual community is to be created, the focus shifts to the users who match those contexts, and who are available or otherwise best-suited to actually participate in the virtual community.

Accordingly, when a user wishes to create a virtual community, a community facilitation system 1010 seeks to match a context of that user (as determined, if not already known, by the context determination system 1002) with other users in the same or similar contexts who are eligible and most likely to participate in the virtual community in a helpful manner.

To this end, the community facilitation system 1010 searches the database 1008 and retrieves context logs that are possible matches to the context of the initiating user. At this level, the retrieved logs may be very broadly related to the context of the initiating user. For example, all context logs having a particular workflow identifier may be identified. In another example, all users who are interacting or have recently interacted with a particular software application or business transaction may be identified.

Once context logs or records have been retrieved, they may be filtered and/or prioritized using a filtering system 1012. In one implementation, the filtering system 1012 generally operates based on user characteristics, using a user profile database 1014 in conjunction with other data sources, including, for example, the workflow engine 1006, the business logic component 118, and various other data sources 1016.

For example, if a given context of a user initiating a virtual community is defined at least in part by a workflow (identifier) that is associated with known security concerns, then all user profiles associated with the workflow may be read from the user profile database 1014 and matched by the filtering system 1012 against the initiating user's security clearance level and a general security clearance level database considered to be included as one of the additional data sources 1016. In this way, only those users who have the same or higher security classifications may be selected for participation in the virtual community being established.

In another example, the community facilitation system 1010 may use the filtering system 1012 to match all user profiles associated with a given context and drawn from the user profile database 1014 against a calendar of, for example, employee vacation days stored in a calendar database of the additional data sources 1016. In this way, for example, users who are currently on vacation may be omitted from invitation to the virtual community being formed.

In the examples just given, it is assumed that the user profiles stored in the database 1014 include only basic information to uniquely identify users, so that the individual user profiles may then be quickly and efficiently matched to (i.e., filtered against) the appropriate databases. Of course, it also may be possible to store all necessary information about users within the user profile database 1014 itself, depending on the number of users being tracked and the amount of information stored with respect to each user.

As just described, filtering of users according to a given standard or criteria may occur only in selected cases (e.g., a security clearance check), or may be more universally applied (e.g., an availability check). Other criteria for filtering may include, for example, a geographic location of users, log-on language(s) of users, or employment title. When a filtering operation results in too few possible community members, for example, when the number of possible members is reduced to zero, then the filtering system 1012 may loosen the criteria and re-apply the filter(s).

Although the filtering system 1012 has been described as removing users who are unsuitable for inclusion in a particular virtual community, it may additionally, or alternatively, be the case that the filtering system 1012 performs a prioritization of users for inclusion in the virtual community. For example, the filtering system 1012 may list users in order of how often they have used a particular software application, whether the users are currently on-line and/or have indicated a preference not to be disturbed, or how well the users have responded to requests in the past (which may be tracked, for example, by allowing users to rate one another with respect to helpfulness in current or previous virtual communities).

In one implementation, the filtering system 1012 may filter out all users who will not be included in the virtual community being formed, and then prioritize remaining users. Conversely, it also is possible to prioritize all users, and then filter unsuitable users from the list of prioritized users. In the latter implementation, for example, progressively narrow filters may be applied to the prioritized list, to ensure that the list of potential community members is not reduced to an unacceptably low level in a first pass of the filter(s).

Once a list of potential community members is identified, the community facilitation system 1010 may proceed with contacting the potential members. For example, the community facilitation system 1010 may send an email to each potential member, explaining the community to be formed and including a link to, for example, a discussion forum or chat room where the community is to be conducted.

Alternatively, the community facilitation system 1010 may use any other communication tool(s) to facilitate contact between members, including, for example, instant messaging or voice (e.g., Voice Over IP). In another implementation, the community facilitation system may simply provide contact information (e.g., e-mail addresses) of members to the initiating user, so that the initiating user may directly contact other members.

Once a virtual community is created, the community facilitation system 1010 may actively or passively monitor and assist in communications between members, depending on the communication forum selected. For example, as referred to above, the community facilitation system 1010 may enable the members to invite another user, who may have expertise in a particular area, to join the community.

Figure 11:
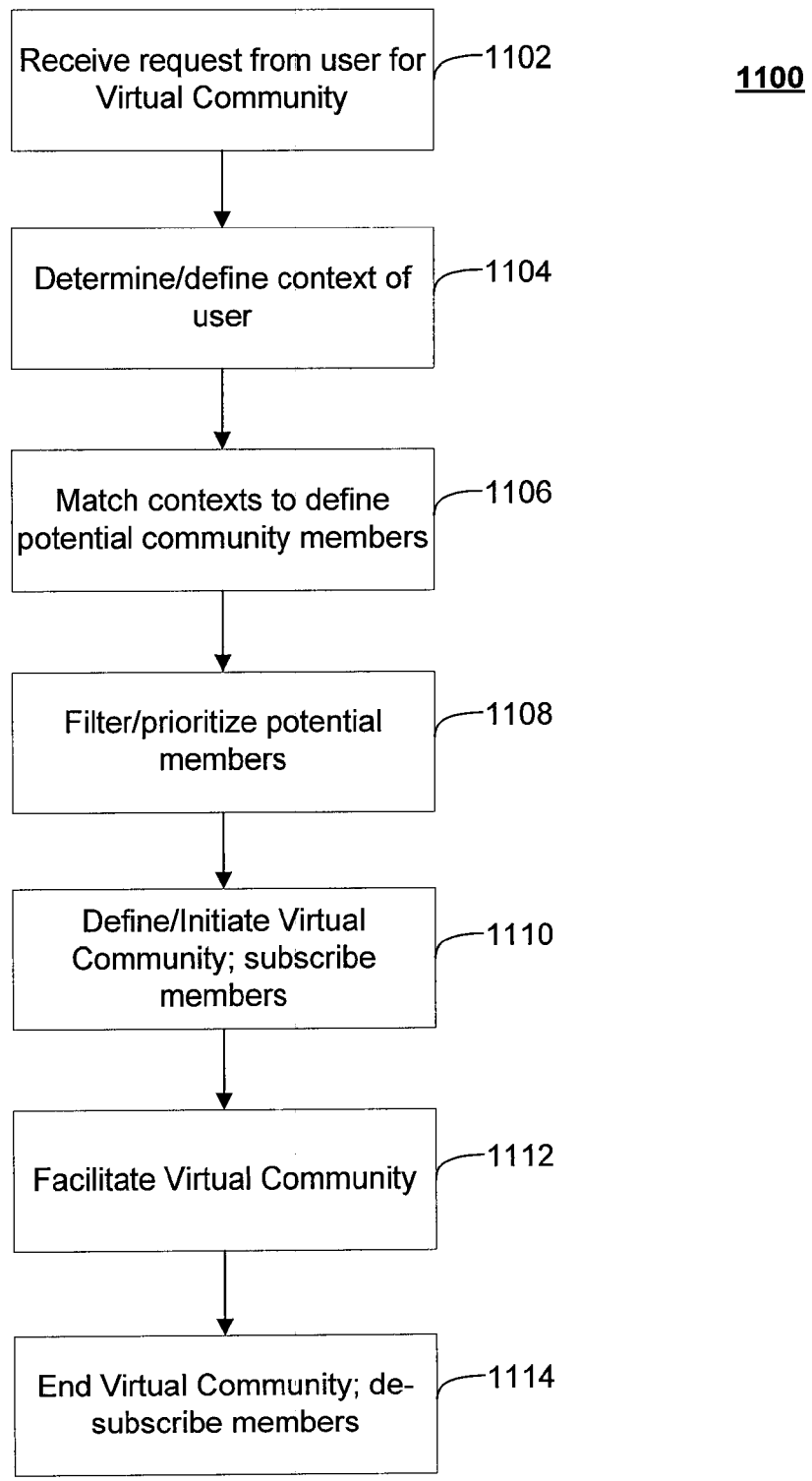
FIG. 11 is a flowchart illustrating an operation of the adaptive virtual community enactment system of FIG. 9.

FIG. 11 is a flowchart illustrating an operation of the adaptive virtual community enactment system 1000 of FIG. 10. In FIG. 11, the system 1000 receives a request from a user within a pool of users, for example, the user A 122, for forming a virtual community (1102).

The system 1000 proceeds by determining or defining a context of the user A 122 (1104). As described above, this determination may be made using a variety of techniques, including, for example, an exchange of questions/answers between the system 1000 and the user A 122, the collection of telemetry data and/or other system information by the system 1000, or by matching a user profile of the user A 122 within the database 1014 to another data source (e.g., the workflow engine 1006).

The system 1000 then matches the determined context against the contexts of the others users within the pool of users to define potential community members (1106). The contexts may be determined on-the-fly using one or more of the techniques just referred to, or other techniques, or may be read from the context history log database 1008.

Once potential members are defined, they may be filtered and/or prioritized (1108). For example, user profiles of the potential members stored in the user profile database 1014 may be matched against various databases (e.g., data sources 1016), and filtered by the filtering system 1012, using various criteria, such as, for example, their current availability, security level, experience level, or user rating.

A remaining number of the potential members are then defined as the members of an adaptive virtual community, and the system 1000 attempts to subscribe the members (1110), using a variety of contact techniques, or otherwise facilitate contact between the members. The system 1000 may then facilitate the community as the members interact (1112), including, for example, re-establishing any broken lines of communication, or inviting other users at the request of one or more members.

Once the members of the community agree that the problem or issue has been resolved, the system 1000 may end the virtual community and de-subscribe the members (1114). At this point, the list of members may be deleted, or may be stored for some pre-determined amount of time, in case the same issue arises or one of the members wishes to re-establish the same virtual community.

Additionally, employers or other interested and authorized parties (e.g., software producers) may be allowed to monitor the virtual communities. Additionally, or alternatively, such parties may be given access to the context history logs within database 1008. In this way, for example, a broad knowledge of specific, re-occurring technical or business contexts may be monitored by appropriate parties. For example, a supervisor in charge of a workflow, which may have multiple instances being executed at any given time, may monitor activity and problem areas across the workflow(s), in order to assist the workers and/or eliminate the problem areas.

FIGS. 12A-12F are illustrations of an adaptive virtual community. In FIG. 12A, the user A 122 is represented as a user named John, and the software application 124 is a travel expense application that includes the feedback button 128. Of course, some other button for requesting a virtual community also may be included, such as, for example, a "Request Virtual Community" button. In FIG. 12A, it is assumed that the user A 122 is a new employee who experiences difficulty when filing a travel expense report using application 124, and selects the button 128 for assistance.

In FIG. 12B, the adaptive virtual community enactment system 1000, or the feedback system 102 of FIG. 1, determines a context of the user A 122 (perhaps by constructing the data model 110 based on telemetry data and user feedback, or by another method discussed above), and matches the context to various other users 134, 512, 1004, 1202, and 1204.

The system 102 or the system 1000 determines in FIG. 12C that, of the users 134, 512, 1004, 1202, and 1204, the user C 512 has a context that closely matches that of the user A 122 (e.g., here, has recently used the travel expense application 124), and is otherwise available and willing to discuss issues related to that context. For example, such a determination may be made using the context-matching, filtering, and/or prioritization techniques discussed above, or by other techniques.

The members 122 and 512 then communicate with one another, in the example of FIG. 12D, using an instant messaging window 1206. In this case, since Jane (the user C 512) has recently completed the same transaction that John (the user A 122) is seeking to complete, she is able to assist in completing the transaction again. Once the transaction is completed, John and Jane agree to terminate their virtual community and cease communicating.

It should be noted that, in this example, Jane need not be an expert with respect to the application 124, although she may be. She may not even be a user who typically uses the application 124, and may not even work at the same company as John. Nonetheless, as long as she has some minimal interaction with the system 1000, the system 1000 of FIG. 10 (or the system 102 of FIG. 1) is capable of successfully identifying her as someone who may be in a position to assist the user A 122, John.

FIG. 12E illustrates a possible result of the above-described adaptive virtual community, where the user A 122 is satisfied that his problem was resolved quickly and easily, and informs other co-workers 1208 of the advantages of adaptive virtual communities. Additionally, FIG. 12F illustrates the ability of the employer of the user A 122 to track transactions and communities such as the one(s) just described, and assemble a usability report 1210. The employer may then act on the report 1210, and/or provide the report 1210 to the producer of the software application 124 for their use in evaluating that application.

Many other examples of adaptive virtual communities exist. For example, in a situation where two or more companies are involved in a merger or potential merger, there may be many different categories of individuals involved in the process(es) at any given time. For example, there may be different types of attorneys, officers, directors, supervisors, and others involved in the merger process. Many areas of practice of the companies may overlap or begin to overlap, while other areas may not.

As the merger proceeds, and particularly as new employees join or are assigned to the process, questions may arise as to past or future aspects of the merger. Virtual communities may allow employees to be connected with knowledgeable other employees in any given context, even if the other employees work for the merger partner or no longer work for either (any) merger partner.

Moreover, as already explained, the virtual communities may be created based on more than a simple categorization of potentially helpful users. That is, a first lawyer with a question is typically not simply connected to other lawyers; he or she may be connected to any category of employee with experience or information about whatever specific context the first lawyer is in.

As described above, the adaptive virtual community enactment system 1000 enables a dynamic, temporary community of users in a proactive manner. That is, the system 1000 determines, on-the-fly, which users from a pool of users should be invited to become members of a community, proactively contacts the users to extend the invitations, maintains the community until the problem or issue is resolved to the satisfaction of the members, and then disbands the virtual community.

Such adaptive virtual communities may generally be differentiated from conventional virtual communities, such as, for example, Internet discussion forums or chat rooms. Such communities typically exist with respect to the discussion of a particular topic or type of information, such as, for example, movies, cars, current events, sporting events or teams, career fields or innumerable other topics. Members generally subscribe or unsubscribe themselves, and, where feasible and desired, such communities exist generally in perpetuity. Moreover, the members of such conventional communities must typically search for, or blindly request (e.g., post a question to a discussion forum), assistance from other members, where the most knowledgeable member on the topic at hand may not even be participating in the forum at the time.

In contrast, adaptive virtual communities as described herein are based on a current technical or business context of an initiating user, as opposed to a general topic of interest, so that the communities may be extremely timely and effective in dealing with concerns of users. Moreover, the pool of users that the system 1000 may interact with need not be currently within the relevant context, and may generally be entirely removed from the context.

Specifically, as already described, some users may not even work for the same company as the initiating user, where the company may be the provider of the adaptive virtual community enactment system 1000. In particular, a given employee may have left the company to work for another company. As another example, an employee of the company may have worked on a particular project at an earlier date, and then re-assigned to another project, but may nonetheless have relevant information concerning the particular project.

It should be understood that the feedback system 102 of FIG. 1 is capable of implementing many of the functionalities of the adaptive virtual community enactment system 1000 of FIG. 10, in addition to providing instant feedback and solutions from the solver 116. However, the system 1000 extends beyond user feedback for software applications, to any setting where communication between community members may prove helpful to one or more members.

In both of the systems 102, 1000 it should be understood that certain components may be omitted or interchanged, and functionality of some components may be implemented in whole or in part by other illustrated components. For example, the filtering system 1012 and related components may be omitted from the system 1000. As another example, the solver 116 of FIG. 1 could be omitted and replaced with a component(s) dedicated to enacting adaptive virtual communities. That is, the system 102 could be implemented as a software feedback system that does not attempt to provide instant solutions, but that immediately initiates an adaptive virtual community to resolve user problems.

A number of implementations have been described. Nevertheless, it will be understood that various modifications may be made. Accordingly, other implementations are within the scope of the following claims.

What is claimed is:

1. A system comprising:
a collection unit configured to:
 receive a user selection of a feedback control,
 receive a stream of telemetry data indicative of real-time information about a technical environment of the user, and
 receive feedback information that is directly entered by the user;
a processor configured to:
 time-stamp the telemetry data and the feedback information,
 construct a data model that describes a business or technical context of the user, based on combining the time-stamped telemetry data and the time-stamped feedback information,
 identify an issue to be resolved based on the business or technical context,
 compare the data model to a pool of standardized data models or business logic, and
 determine whether the issue can be resolved based upon comparing the data model to the pool of standardized data models or the business logic; and
a feedback unit configured to:

output a solution to the issue, if it is determined that the issue can be resolved, and initiate an adaptive virtual community, if it is determined that the issue cannot be resolved.

2. A method comprising:

receiving a user selection of a feedback control;

receiving a stream of telemetry data indicative of real-time information about a technical environment of the user;

receiving feedback information that is directly entered by the user;

time-stamping the telemetry data and the feedback information;

constructing a data model describing a business or technical context of the user, based upon combining the time-stamped telemetry data and the time-stamped feedback information;

identifying an issue to be resolved based upon the business or technical context;

comparing the data model to a pool of standardized data models or business logic;

determining whether the issue can be resolved based upon comparing the data model to the pool of standardized data models or the business logic;

outputting a solution to the issue, if it is determined that the issue can be resolved; and initiating an adaptive virtual community, if it is determined that the issue cannot be resolved.

3. An apparatus comprising a storage medium having instructions stored thereon, the instructions comprising:

a first code segment for receiving a user selection of a feedback control;

a second code segment for receiving a stream of telemetry data indicative of real-time information about a technical environment of the user;

a third code segment for receiving feedback information that is directly entered by the user;

a fourth code segment for time-stamping the telemetry data and the feedback information;

a fifth code segment for constructing a data model describing a business or technical context of the user based upon combining the time-stamped telemetry data and the time stamped feedback information;

a sixth code segment for identifying an issue to be resolved based upon the business or technical context;

a seventh code segment for comparing the data model to a pool of standardized data models or business logic;

an eighth code segment for determining whether the issue can be resolved based upon comparing the data model to the pool of standardized data models or the business logic;

a ninth code segment for outputting a solution to the issue, if it is determined that the issue can be resolved; and a tenth code segment for initiating an adaptive virtual community, if it is determined that the issue cannot be resolved.

4. The method of claim 2, wherein the telemetry data includes system performance benchmarks, exception reports, error messages, server identification data, software version data, or data indicative of a current working environment of the user.

5. The method of claim 2, wherein the feedback information is structured feedback information the user selects from a list of possible answers.

6. The method of claim 2, wherein the feedback information is unstructured feedback information corresponding to a written description of a problem.

7. The method of claim 2, wherein the data model includes an application-specific portion and a non-application specific portion.

8. The method of claim 7, wherein the application-specific data portion includes information pertaining to a particular software application being used by the user.

9. The method of claim 7, wherein the non-application specific portion includes information about the user including a user identifier of the user, general system information about the user, a location of the user, or a language of the user.

10. The method of claim 2, wherein the data model is constructed using a pre-determined, standardized format.

11. The method of claim 10, wherein the pre-determined standardized format stores information about a location of the user using latitude and/or longitude coordinates.

12. The method of claim 2, further comprising providing a series of questions to the user.

13. The method of claim 12, wherein the questions are provided through a graphical user interface.

14. The method of claim 2, wherein the solution identifies a cause of the issue.

15. The method of claim 2, wherein initiating an adaptive virtual community comprises:

receiving a request to initiate an adaptive virtual community;

determining, based upon the business or technical context of the user, potential members of the adaptive virtual community;

filtering potential members of the adaptive virtual community based on the experience and/or availability of the potential members;

defining actual members of the adaptive virtual community based upon the filtering of the potential members, wherein the actual members include the user;

subscribing the actual members of the adaptive virtual community; and enabling the actual members of the adaptive virtual community to interact.

16. The method of claim 15, wherein filtering is prioritizing.

17. The method of claim 15, wherein the actual members interact via electronic means.

* * * * *